United States Patent [19]
Glucksman et al.

[11] Patent Number: 5,676,041
[45] Date of Patent: Oct. 14, 1997

[54] COFFEE BREWING APPARATUS

[75] Inventors: Dov Z. Glucksman, Wenham; Karl H. Weidemann, Hull; Ron J. Glucksman, Cambridge; John A. Deros, Salem, all of Mass.

[73] Assignee: Appliance Development Corp., Dahvers, Mass.

[21] Appl. No.: 383,352

[22] Filed: Feb. 3, 1995

[51] Int. Cl.⁶ .............................. A23L 3/00; A47J 31/00; A47J 31/42; A47J 31/54
[52] U.S. Cl. .............. 99/286; 99/289 R; 99/295; 99/323.3
[58] Field of Search .............. 99/279–283, 286, 99/275, 289 R, 290, 291, 295, 299, 300, 302 R, 304–307, 316, 323.3; 221/96; 222/129.1–129.4, 146.5; 426/231, 388, 433

[56] References Cited

U.S. PATENT DOCUMENTS

| | | | |
|---|---|---|---|
| 2,373,171 | 4/1945 | Daly | 222/127 |
| 3,200,994 | 8/1965 | Levinson et al. | 222/82 |
| 3,353,717 | 11/1967 | Edwards | 222/132 |
| 3,718,234 | 2/1973 | Bagguley | 222/135 |
| 4,624,177 | 11/1986 | Ito et al. | 99/286 |
| 4,815,633 | 3/1989 | Kondo et al. | 222/129.4 |
| 4,826,695 | 5/1989 | Tanner | 99/287 X |
| 4,913,916 | 4/1990 | Tanner | 99/295 X |
| 4,990,734 | 2/1991 | Hirsch | 99/306 X |
| 5,024,355 | 6/1991 | Jouillat et al. | 222/162 |
| 5,087,469 | 2/1992 | Acree | 426/544 |
| 5,125,534 | 6/1992 | Rose et al. | 222/54 |
| 5,158,793 | 10/1992 | Helbling | 426/231 |
| 5,168,794 | 12/1992 | Glucksman | 99/295 |
| 5,183,182 | 2/1993 | Comstock et al. | 222/129 |
| 5,197,372 | 3/1993 | Schneeberger | 99/287 |
| 5,207,148 | 5/1993 | Anderson et al. | 99/281 |
| 5,214,998 | 6/1993 | Konoeda | 99/275 |
| 5,303,639 | 4/1994 | Bunn et al. | 99/289 |
| 5,307,733 | 5/1994 | Enomoto | 99/280 |
| 5,471,910 | 12/1995 | Sager | 99/289 R |

*Primary Examiner*—Timothy F. Simone
*Attorney, Agent, or Firm*—Sofer & Haroun, LLP

[57] ABSTRACT

A coffee brewing apparatus for producing a selectively flavored, liquid coffee beverage, having a housing, a receptacle, securable to the housing, for retaining ground virgin coffee beans to be brewed, a dispensing means, at least partially disposed within the housing, for optionally dispensing flavored compositions into the receptacle and onto the ground coffee contained therein and brewing means, at least partially disposed within the housing, for introducing a heated liquid into the receptacle to thereby produce a selectively flavored coffee beverage is provided.

27 Claims, 13 Drawing Sheets

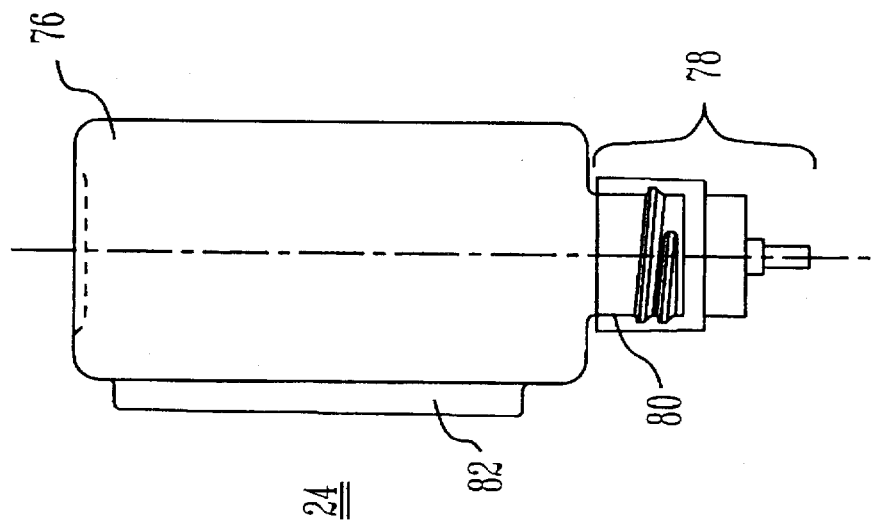
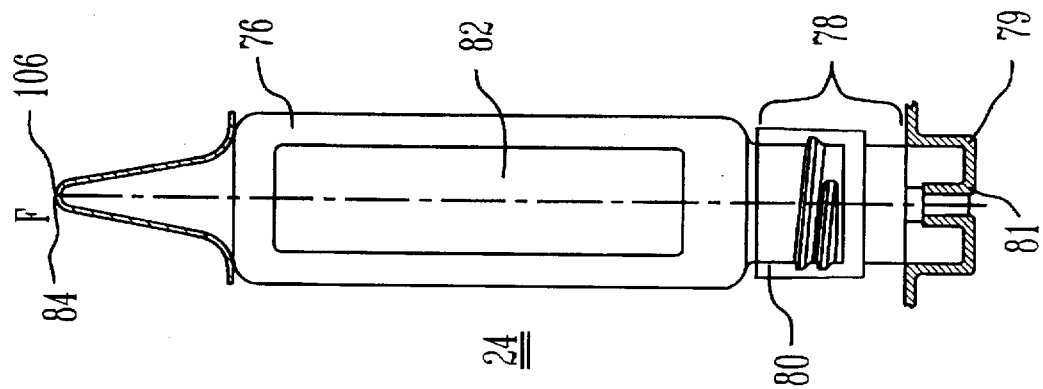

COFFEE BREWING APPARATUS

FIELD OF THE INVENTION

The present invention relates generally to a method of brewing coffee wherein virgin coffee beans are ground in a grinder, a flavoring is dispensed onto the ground virgin coffee beans with the flavored ground coffee beans being brewed in a brewing apparatus and, additionally, to a coffee brewing apparatus comprising means for grinding, means for dispensing and means for brewing.

BACKGROUND OF THE INVENTION

Freshly ground coffee has numerous advantages to instant coffee. The brewed coffee, when made from freshly ground beans, has a superior aroma and taste compared to coffee brewed from previously ground beans or instant coffee. If the coffee has been pre-ground and packed, it is more likely to become stale and lose its flavor after the package has been opened. It is also inconvenient to utilize small pouches, such as the two to three ounce size as they are subject to spillage and pilferage. In addition, it is considered by many consumers to be more economical to grind the coffee themselves than to purchase ground coffee.

Accordingly, it has been the experience of coffee connoisseurs throughout the world that the best way for enjoying coffee is by the fresh grinding of virgin beans and the immediate subsequent brewing of the virgin beam. Similarly, most coffee connoisseurs prefer flavorings in their coffee in combination with the benefits of fresh grinding and fresh brewing. However, a problem is encountered when one grinder is used for many types and flavors of coffee. Until this time, one accepted technique of providing flavored coffee is to coat the outer surface of the virgin coffee beam with a flavoring. This coating process typically takes place in a large cement type mixer in which a flavoring is added to the virgin beans. The mixer distributes the flavoring thus coating the outermost surfaces of the coffee beam. Thereafter, the user then grinds the coated beans and brews the coated ground beans in order to produce a flavored coffee.

However, problems are encountered when one grinder is used for many types and flavors of coffee. Specifically, the resin and sediment from the flavors that are present on the coated bean become intermingled in the grinder and grinder blade and thus very difficult to clean. Accordingly, when one type of flavor is first used in a typical grinder, residue remains in the grinder thus contaminating the grinding of a second flavor of coffee. This means that the grinder comes into contact with different coffee flavors thus reducing the integrity of the desired coffee flavor.

Another problem that exists in the prior art is that individuals prefer to vary the amount of flavoring in their coffee with some individuals preferring a stronger flavoring while others a weaker flavoring. With the prior art coating process, there is no way to individually adjust the amount of flavoring in the final brewed coffee as often large batches of flavored coffee beans are prepared. Accordingly, if one household desires a strong, weak and normal flavoring, the consumer would have to purchase the three strengths of flavored coffee, if such is available.

Many attempts have been made to overcome the problems associated with the use of flavored coffee beans in automatic drip coffee makers. However, prior art coffee brewing devices have suffered from a variety of drawbacks and deficiencies. For example, U.S. Pat. No. 4,815,633 to Kondo et al. discloses an automatic coffee vending machine which serves a straight coffee and a blended coffee selectively. Specifically, this reference discloses the use of different varieties of ground coffee powders or coffee beans which are stored separately and may be blended in any combination of varieties of which can be served as requested.

While the Kondo et al. automatic coffee vending machine allows the use of different varieties of ground coffee powders, this reference does not teach a means for dispensing a flavoring on to the virgin coffee beans after the virgin coffee beans have been ground or a means for grinding virgin coffee beans. As well, this reference does not teach the method of placing virgin whole beans in the grinding container; grinding the beans to a desired fineness; dispensing flavoring onto the ground beans; and brewing the flavored ground beans.

U.S. Pat. No. 5,303,639 to Bunn et at. discloses an automatic beverage brewing apparatus which includes means for selectively combining two or more substances for brewing, flavoring and mixing a brewed beverage. The apparatus includes a plurality of controllable substance dispensers or hopper assemblies which are positioned to communicate with the brew chamber by dispensing a desired substance into the funnel leading to the brewing chamber.

Although the Bunn et al. device enables the user to select a plurality of substances, this reference does not teach or suggest the use of a means for grinding the virgin coffee beans, means for dispensing a flavoring onto the virgin coffee beans and a means for brewing the flavored ground coffee beans.

U.S. Pat. No. 5,158,793 to Helbling discloses a coffee machine having a plurality of carafes which can be filled selectively with decaffeinated or normal coffee. The coffee machine utilizes a microprocessor which selects either decal or normal coffee for delivery to the brewing chamber in response to signals received from the carafes as they are placed in respective stations on the machine so that a decaffeinated carafe in any station will receive only decaffeinated coffee and a normal carafe will receive only normal coffee regardless of the station at which the carafe is placed.

This reference does not teach a method wherein the virgin coffee beans are Found in a grinder, a flavoring is dispensed onto the ground virgin coffee with the flavored coffee beans thereafter being brewed. More particularly, this reference does not teach a coffee brewing apparatus wherein a means for grinding, a means for dispensing and a means for brewing are unitary with the coffee brewing apparatus.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

OBJECTS AND SUMMARY OF THE INVENTION

It is an object of the present invention to provide a coffee brewing apparatus which includes a means for grinding virgin coffee beans, a means for dispensing a flavoring onto the virgin coffee beans after the virgin coffee beans have been ground and means for brewing the favored coffee beans, the means for grinding, the means for dispensing and the means for brewing being unitary with said coffee brewing apparatus.

It is a further object of the present invention to provide a method of brewing a flavored coffee from virgin whole coffee beans comprising the steps of grinding the virgin whole beans in the grinding apparatus, dispensing of flavoring onto the ground virgin beans and brewing the flavored ground beans in a brewing apparatus.

It is another object to provide a coffee brewing apparatus wherein the grinder exclusively grinds virgin coffee beans and thus the grinder blade does not come into contact with different coffee flavors thus ensuring the integrity of the coffee flavors.

It is a further object of the present invention to provide a coffee grinder to grind roasted virgin coffee beans which will grind the beans to a selected fineness having the greatest proportion of particles in an optimum size range so that the ground coffee will provide a relatively greater quantity of brewed liquid coffee and the brewed coffee will have a consistent strength from cup to cup, even though brewed from different batches of beans.

It is a further object of the present invention to provide such a coffee grinder that will grind the coffee by cutting (slicing) and not by crushing or pulverizing.

A further object of the invention is to provide a novel coffee grinder wherein the grinding cup is positioned below the grinding blade and downwardly removable from the coffee grinder, thus allowing the coffee beans to be ground within the grinding cup.

An additional object is to permit easier cleaning and emptying of the ground coffee from the coffee grinder by providing a removable grinding cup wherein the grinding of the coffee beans takes place within the grinding cup.

Moreover, it is an object to provide a grinding blade that is easily removable from the motor shaft reducing the risk of harm to the consumer.

Another object is to dispense a flavoring onto the freshly ground virgin coffee beans prior to brewing of the ground coffee and to provide uniform dispersion of the flavoring while brewing the flavored ground coffee.

Still another object is to provide a plurality of flavor dispensers unitary with the coffee brewing apparatus so that the consumer may select a flavoring from among the plurality of flavor dispensers.

An additional object is to allow the consumer to control or vary the amount and type of flavor to be added to the ground coffee beans prior to brewing.

In accordance with the present invention, a coffee brewing apparatus is provided which comprises a means for grinding virgin coffee beans, a means for dispensing of flavoring onto the virgin coffee beans after the virgin coffee beans have been ground and means for brewing the flavored ground coffee beans.

The means for grinding the virgin coffee beans includes a motor having a motor shaft positioned along a vertical axis. One end of the motor shaft is threadedly connected to a blade shaft, with the blade shaft being connected to a grinder blade. When the motor is energized by completion of a circuit, the motor shaft rotates thus rotating the blade shaft and the grinding blade. Accordingly, the virgin coffee beans contained in the grinding cup are ground.

Activation of the motor assembly by completion of the circuit is accomplished when the grinding cup is positioned beneath the motor assembly and rotated to energize an activation means.

Specifically, the grinding cup is filled with roasted whole coffee beans and is positioned beneath the motor assembly and the grinding blade. To ensure that the grinding cup does not have to be held in place or does not fall from the grinder, the grinding cup may be provided with one or more guide surfaces that ride in a corresponding guide groove in the coffee grinder. Openings along the guide groove allow the guide surfaces to be inserted into the guide groove so that the lower surface of each guide ring rides on the upper surface of the guide groove. Thus, when the guide surfaces of the grinding cup are inserted into the guide groove and when the grinding cup is rotated, an activation means allows the circuit to be completed thus energizing the motor assembly thereby grinding the coffee beans within the grinding cup. The circuit is broken when the grinding cup is rotated in the opposite direction thus de-energizing the coffee grinder motor.

In order to activate the activation means and to complete the circuit, either a camming tooth, circuit completer leads or a camming surface may be located on the outer surface or upper rim of the grinding cup. However and as presently contemplated, any type of activation device known by those of skill in the art that allows a circuit to be completed may be used.

For example, when utilizing a camming tooth and when the grinder cup is rotated counterclockwise about the vertical axis, the camming tooth moves a limit switch having a resiliently biased lever in an upward vertical direction. This limit switch is normally biased in a downward non-energized position. By this movement, the circuit between the leads is completed, sending current from the power supply to the motor thereby turning on the motor so that the coffee beans in the grinding cup are ground. Upon reaching a desired grinding time and fineness, the consumer then rotates the grinding cup in an opposite direction thus disengaging the camming tooth from the activation means and interrupting the circuit whereby power from the power supply is interrupted. As such, the motor is turned off causing the motor shaft, blade shaft and grinding blade to stop rotating. The grinding cup is removed from the guide groove of the grinder through the guide ring openings.

Another feature of the grinding means is that the motor shaft includes a threaded engagement surface at a first end for threadedly engaging the blade shaft. The second end of the motor shaft may be slotted so that a screw-driver may be inserted into the slot to prevent the motor shaft from rotating. By preventing the motor shaft from rotating, this allows the user to threadedly disengage the blade shaft from the first end of the motor shaft when worn. In this way, the blade shaft and grinding blade may be easily replaced.

Additionally, the grinder motor may include a speed controller for varying the speed of the grinding blades thus controlling the fineness of the virgin coffee beans. As well, the grinding means may include a timing means for selectively determining the duration of grinding time.

The benefits of the present invention over the prior art coffee grinders are readily apparent. Specifically, prior art grinders typically are arranged so that a base unit contains the motor, motor shaft and grinding blade, with the grinding blade positioned within a grinding cavity. As such, the base unit which contains the grinding blade is positioned above the motor. Coffee beans are then placed into the grinding cavity and covered. However, when energized, the force on the ground coffee beans that is generated by the rotating blades, causes the grounds in the grinder cup to be compacted within the sides of the grinding cavity. As the grounds are compacted inside the grinding cup, in order to empty the ground coffee into a coffee brewer, the user must invert the grinder above the coffee filter basket and shake or tap the coffee grounds so that they empty into the filter in the filter basket. However, such shaking or tapping usually does not completely empty the grinding cavity. Accordingly, one must insert a utensil into the grinding cavity to knock loose the compacted ground coffee. Unfortunately, in most instances the consumer inserts a finger in order to clean or knock loose the compacted ground coffee increasing the risk of harm and injury.

As shown and described, the inverted coffee grinder avoids the aforementioned problems by positioning the motor and grinding blade above the grinding cup which allows the grinding to be done within the grinding cup. In this way, the user does not have to invert the coffee grinder in order to empty the ground coffee into the filter but need only remove the grinding cup from the grinder and tap or shake the grinding cup over the filter. As to the compacted ground coffee, the user, if desired, may now use a finger to loosen the compacted ground coffee from the side edges running no risk of injury from the sharp grinding blade.

Turning now to the means for dispensing flavoring onto the virgin coffee beans, one or more dispensing means for dispensing a flavoring onto the virgin coffee beans after the virgin coffee beans have been ground may be provided. Accordingly, such dispensing means includes a flavor bottle or container and a metering mechanism. Such a metering mechanism as presently contemplated by the invention, utilizes an inverted pump sold under the trade name PFEIFFER. However, and as is apparent to one skilled in the art, any type of pump or metering mechanism that dispenses a controlled amount of liquid may be utilized. Such embodiments can be an inverted or upside down pump dispenser or valve or even an upright pump mechanism which is commonly used with soap dispensers.

Typically such dispensers are provided with a threaded neck portion with the metering mechanism being adapted to be mounted on the threaded neck portion of the container. As well, the container defines an indication area for indicating the type of flavoring in the container. The indication area projects through an aperture located in the middle portion of the coffee brewing apparatus allowing a consumer to know what type of flavoring is in the container.

The dispensing means is dimensioned and arranged to be positioned in the middle portion of the coffee brewing apparatus between the grinding means and the brewing means. However, it is to be understood by one skilled in the art that the positioning of the dispensing means is not critical to the operation of the coffee brewing apparatus.

The coffee brewing apparatus also includes a dispensing compartment having a first forward portion and a second rear portion. Each of the flavor bottles are dimensioned and arranged to fit within the forward portion of the dispensing compartment so that the indication area which projects through the aperture in the coffee brewing apparatus can be viewed by the consumer. Each of the flavor bottles rests on a shelf having an opening so that part of the meter means may project therethrough. In this way, when a force is applied by a flavor button which depresses the flavor bottle and a portion of the metering mechanism relative to the shelf, a metered mount of flavoring is dispensed. The second compartment may be dimensioned and arranged to receive and store extra brewing filters.

In accordance with the present invention, means for brewing the flavored coffee beans is provided. Any type of brewing means known to one of ordinary skill in the art may be utilized. Typically, such brewers include a water holding compartment, a heating or boiling compartment, and a brewing compartment. The water holding compartment is substantially sealed by a removable cover and is filled with a variable quantity of water, depending upon the number of cups of coffee desired. In the heating compartment, electrical heating means is provided which imparts heat to the water to bring the water to a desired temperature. Discharge means in the form of a conduit or tube is located in the heating compartment and has one end in communication with the water within the water holding compartment and its other end in communication with the brewing compartment which is at atmospheric pressure. When the water reaches a predetermined temperature of approximately 90°–95° Celsius, the differential pressure, that is the pressure within the heating compartment acting against the pressure within the water holding compartment causes the water to be discharged through the tube into the brewing compartment.

The brewing compartment or receptacle contains a filter holder which holds a cup shaped permeable paper coffee filter. Depending upon the number of cups of coffee to be brewed, the level of the bed of coffee grounds in the filter will correspondingly vary. Accordingly, the heated water is introduced into the brewing compartment and allowed to contact the ground coffee. An outflow aperture is dimensioned and arranged to permit discharge of brewed coffee therefrom and into a carafe positioned beneath the brewing compartment.

The coffee brewing apparatus may be provided with a means for frothing a liquid. Typically, such frothing means, which is also unitary with the coffee brewing apparatus, is powered by the same power supply, and is constructed and arranged as normally utilized in the prior art and is not a new and novel part of this invention. Accordingly, such a frother means combines stem and air to produce aerated or frothed milk by utilizing a pressurized vessel partially filled with water, a heater for generating steam and a steam ejector. The water is heated to create the steam which is forced through the steam ejector or frothing tunnel which functions to aerate the steam. A steam valve assembly is coupled to the pressurized vessel for releasing desired amounts of aerated steam causing the milk in a container to froth. Other prior art frothers, as described in U.S. Pat. No. 5,330,266 to Stubaus, produce frothed milk within a frothing tunnel or conduit.

With reference to the specific structure of the coffee brewing apparatus, the apparatus which includes the aforementioned grinding means, dispensing means and brewing means also includes a base portion and a vertical body portion having a first side, a second side and a middle portion. The vertical body portion is connected to the base portion wherein the grinding means is proximate to the first side, the dispensing means is proximate to the middle portion and the brewing means is proximate to the second side. Accordingly, the coffee brewing apparatus is provided as a unitary integral one piece appliance.

DETAILED DESCRIPTION OF THE DRAWINGS

In the drawings, wherein like reference characters denote similar elements throughout the several views:

FIG. 10A is a front elevational view of the flavor bottle of the coffee brewing apparatus as shown in FIG. 1;

FIG. 10B is a side elevational view of the flavor bottle as shown in FIG. 10A.

DETAILED DESCRIPTION OF THE PRESENTLY PREFERRED EMBODIMENTS

Figure 1:
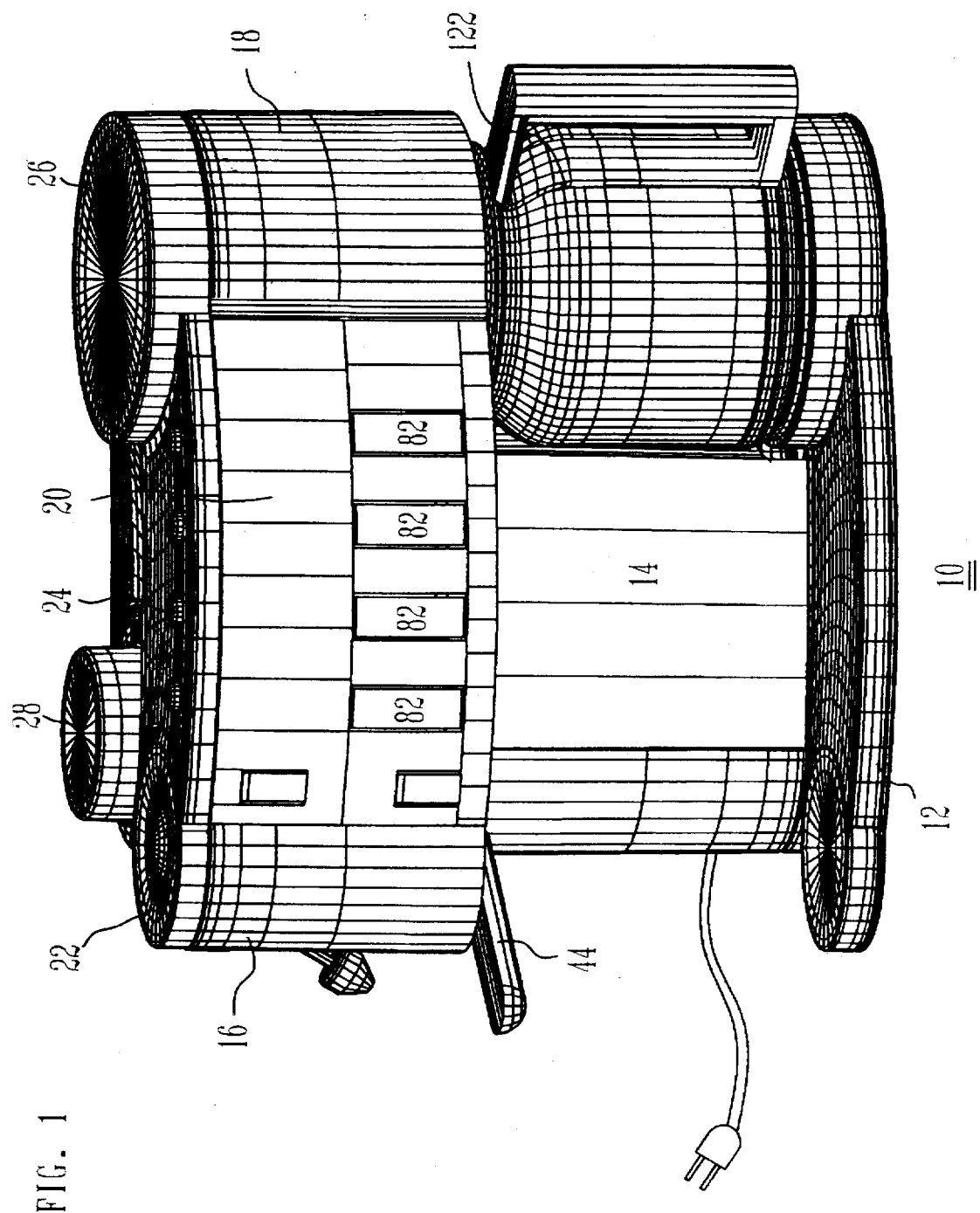
FIG. 1 is a perspective view of a coffee brewing apparatus with a grinder, dispenser, brewer and frother constructed in accordance with an illustrative embodiment of the present invention.

Referring now to the drawings for a more detailed description of the present invention and more particularly to FIG. 1 thereof, a coffee brewing apparatus is generally designated by the reference character 10 and includes a housing having a base portion 12 which is connected to and supports a vertically extending main body portion of the housing which portion is generally designated by reference element 14. The main body portion 14 has a first side 16, a second side 18 and a middle .portion 20. Within the main body portion 14 are a grinding means 22, a brewing means 26 and a dispensing means 24. As shown in FIG. 1, the grinding means 22 is coupled to the housing and more specifically is located proximate to the first end 16, the dispensing means 24 is at least partially disposed within the housing and is located proximate to the middle or intermediate portion 20 and the brewing means 26 which is at least partially disposed within the housing is located proximate to the second end 18. As will be readily apparent to those skilled in the art, these components may be arranged in any convenient order within the main body portion. Optionally and as shown in FIG. 1, a frothing means 28 may be provided, the frothing means 28 also being unitary with the coffee brewing apparatus 10.

Figure 8:
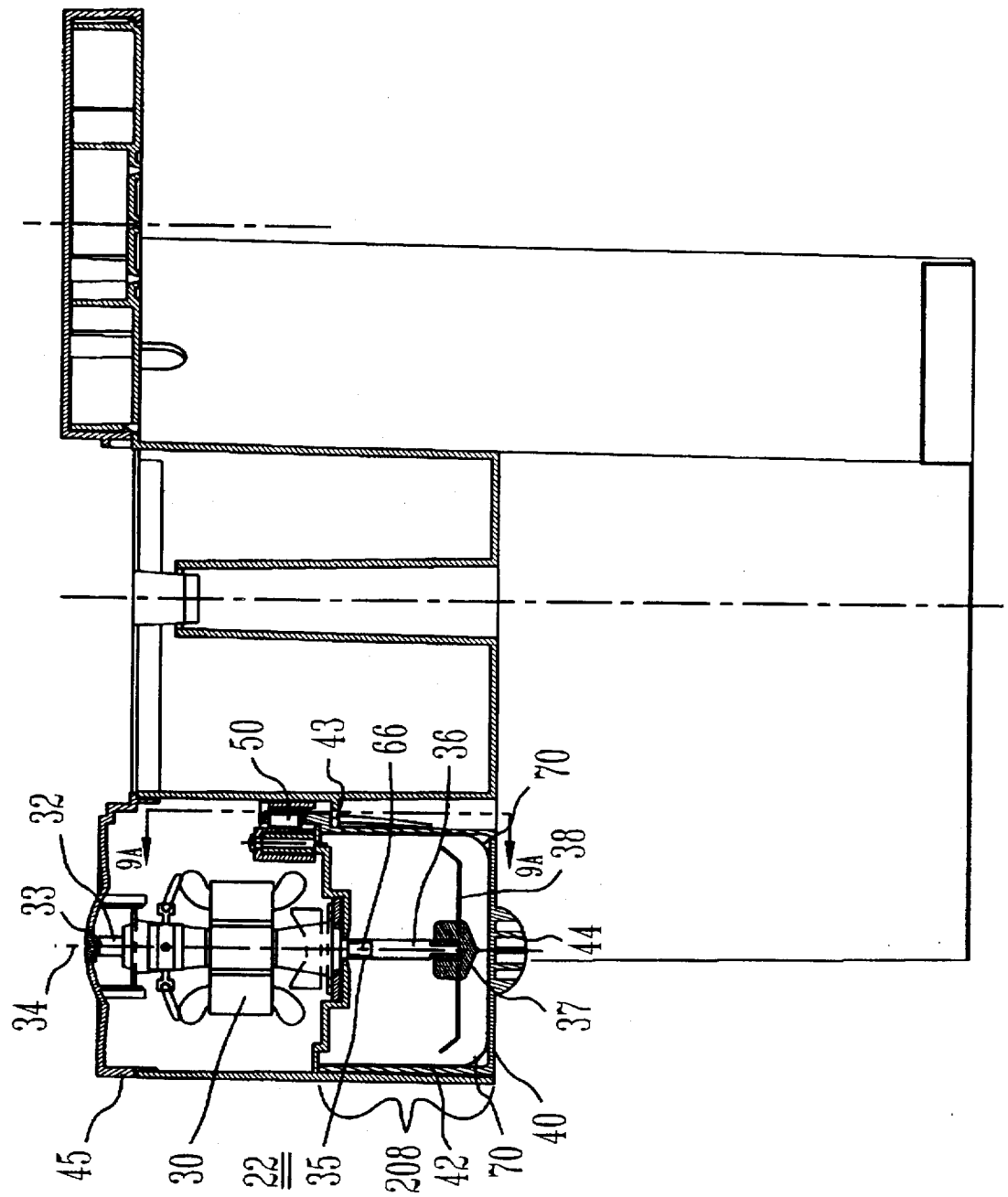
FIG. 8 is a cross sectional side view, taken across line D—D in FIG. 1, so as to show the grinding means.

Referring first to the grinding means 22 and as best shown in FIG. 8, the grinding means 22 for grinding virgin coffee beans (not shown) includes a driving means 30 such as an electric motor which is connected to a motor shaft 32 positioned along a vertical axis 34. The motor shaft 32 is connected to a blade shaft 36 which is also positioned along the vertical axis 34. The distal end of the motor shaft, designated as reference numeral 35, is threadedly engageable with the grinding shaft 36 to retain the blade shaft 36 during rotation thereof. The grinding shaft 36 is connected by a housing 37 to a grinding blade 38 for rotary movement therewith. Typically and as presently preferred, the grinding shaft 36, the housing 37 and the grinding blade 38 is formed by an insert molding method. This method allows for both the metallic grinding shaft 36 and the stainless steel blade 38 to be secured by a mold, thus allowing a plastic material, which when cooled forms the housing 37, to be injected around both the shaft 36 and the blade 38.

Also as shown in FIG. 8, the second or proximal end 33 of the motor shaft 32 may be provided with means for selectively restricting rotation of a proximal end of the motor shaft 32 (not shown) such as a slot or groove so that a screw-driver or the other similar tool can be inserted into the restricting means to prevent the motor shaft 32 from rotating and so that the blade shaft 36 may be threadedly disengaged from the distal end 35. In this way, when the grinding blade 38 becomes worn, the blade shaft 36, housing 37 and grinding blade 38 may be easily replaced.

Additionally, the grinding means 22 may include a speed controller (not shown) for varying the speed of the grinding blade 38 thus controlling the fineness of the ground coffee beans. The grinding means 22 may also include a timing means (not shown) for selectively turning the motor 30 on or off thereby setting the duration of the grinding time.

Activation of the grinding means 22 is accomplished when the grinding cup 40 which is removable relating to the grinding blade 38, is positioned beneath the motor 30, the blade shaft 36 and the grinding blade 38 and rotated to engage an activation means 50 which selectively energizes the electric motor 30. Specifically, the grinding cup 40 is filled with roasted whole virgin coffee beans (not shown) and is positioned beneath the motor 30 and grinding blade 38. To ensure that the grinding cup does not have to be held in place and that it is secured to the grinding means 22, one or more guide surfaces 41 are provided. These guide surfaces 41, as shown in FIG. 9B, ride on a corresponding guide groove 43 in the inner surface of the grinder housing 45 as shown in FIG. 8. One or more openings (not shown) along the guide groove 43 allow the guide surfaces 41 to be inserted into the guide groove 43 so that the lower surface of each guide ring 41 rides on the upper surface of the guide groove 43. Thus, when the guide surfaces 41 of the grinding cup 40 are inserted into the guide groove 43 and when the grinding cup 40 is rotated, the grinding cup 40 is held secure to the grinder housing 45.

Figure 9A:
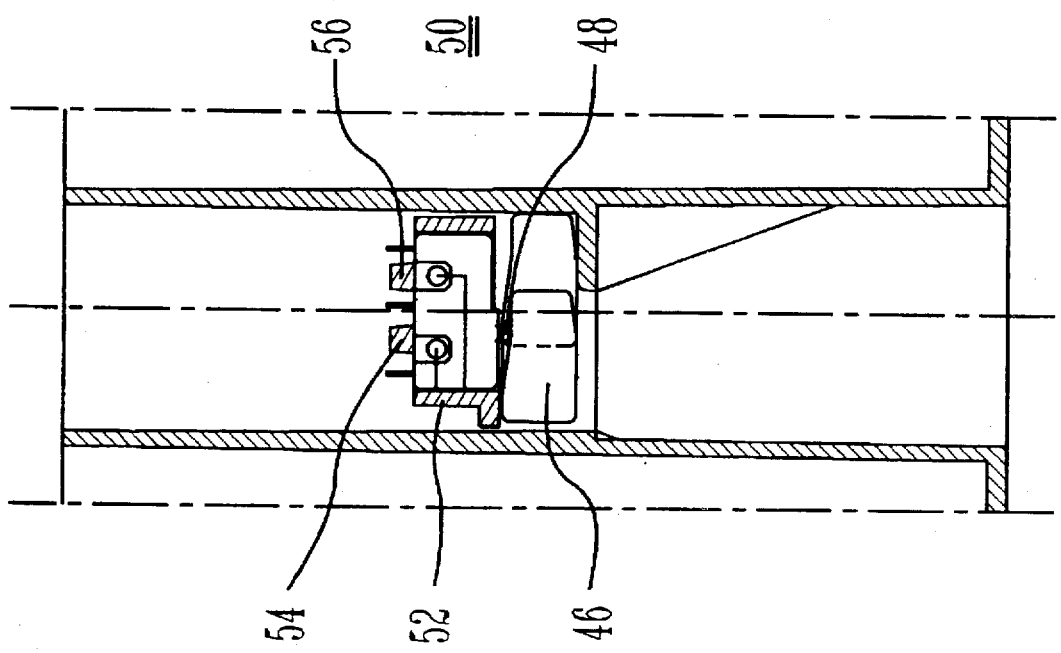
FIG. 9A is a cross sectional side view, taken across line E—E in FIG. 1, showing a segment of the grinder having a switch actuator.
Figure 9B:
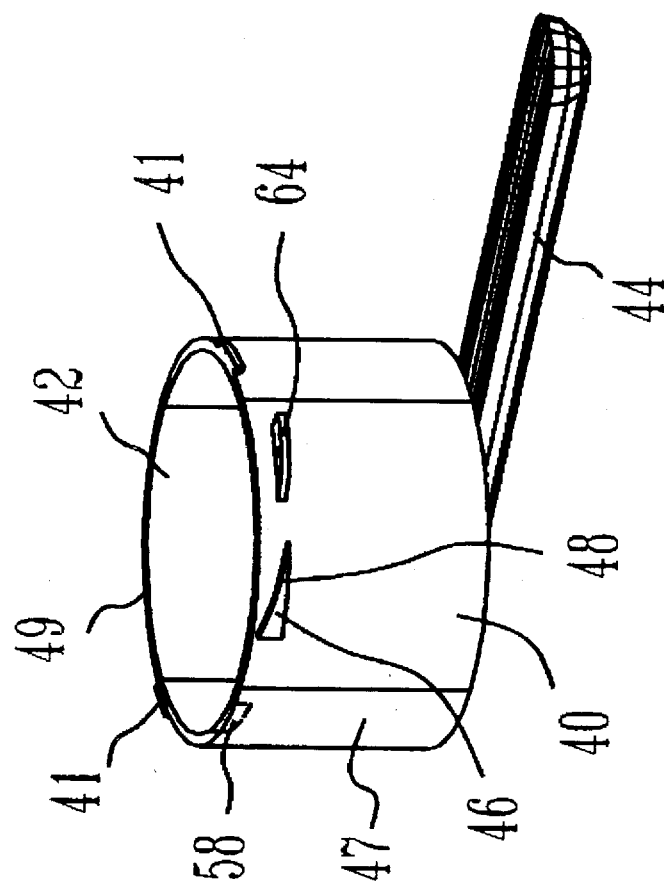
FIG. 9B is a perspective view of a grinder cup constructed in accordance with an illustrative embodiment of the present invention.

Referring to FIG. 9A, the activation means 50 includes a limit switch 52 having a resiliently biased lever movable between a first non-energizing position wherein the circuit between the power supply (not shown) and the motor 30 is interrupted and a second energizing position wherein the circuit is completed. As is evident, the limit switch 52 is biased in a first non-energized position. The activation means 50 allows the circuit to be completed thus energizing the motor 30, which turns the motor shaft 32, the blade shaft 36 and the grinding blade 38 grinding the coffee beans in the grinding cup 40. The circuit is disengaged when the grinder cup 40 is rotated in the opposite direction thus de-energizing the motor 30. As will be appreciated by those skilled in the art, rotation of the grinding cup 40 in order to activate the activation means may be in either a clockwise or counter-clockwise direction. The embodiment shown in FIG. 9B provides for activation of the activation means when the grinder cup 40 is rotated in a counter-clockwise direction.

Referring back to FIG. 9A, the limit switch 52 which is biased in a first nonoperating position, rides up on the camming surface 48 of the camming tooth 46 of the grinding cup 40. In this way, the limit switch 52 is positioned in the second energizing position. For example and as shown in FIG. 9B, a camming tooth 46, a circuit completer 58 or an engaging tooth 64 may be located on the outer surface 47 or upper rim 49 of the grinder cup 40. However, and as presently contemplated by the invention, any type of device known by those skilled in the art that allows a circuit to be completed may be used.

Referring to the embodiment shown in FIG. 9B, the circuit shown by leads 54, 56 is completed when the limit switch 52 is biased in the energizing position. In this way, power is sent to the motor 30 from the power supply (not shown) thereby grinding the coffee beans in the grinding cup 40. Upon reaching a desired grinding time and fineness, the grinding cup 40 is rotated in a clockwise position. By such rotation, the limit switch 52 is no longer supported by the camming surface 48 and as such the circuit between leads 54, 56 is no longer completed causing the motor 30 to become inoperative.

The grinding cup 40 is provided with an inner surface 42, an outer surface 47 and a handle portion 44. The inner surface 42 is preferably provided with a metal liner in order to ensure the integrity of the grinding cup 40 which, preferably, is made of a stainless steel material.

The benefits over the prior art grinders is readily apparent. For example, prior art grinders are arranged so that a base unit contains the motor, motor shaft, blade shaft and grinding blade within a grinding cavity. As such, the base unit which contains the grinding blade is positioned above the motor. Coffee beans are then placed in the cavity and covered. However, the force on the ground coffee in the grinding cavity causes the grounds to be compacted within the sides of the grinding cavity.

The present grinding means avoids that aforementioned problems by positioning the motor 30 and the grinding blade 38 above the grinding cup 40. In this way, the user does not have to invert the coffee grinder and tap or shake the grinder over the falter holder 118 in order to loosen the compacted ground coffee at the sides 70 of the grinding cup. Moreover, as the motor 32, motor shaft 34, blade shaft 36 and grinding blade 38 are all positioned above the grinding cup 40 this permits the grinding cup 40 to be separable from the grinder 22 and may be carried by a consumer to a flavor dispenser, as will be discussed later, or a brewing means 26.

Figure 9C:
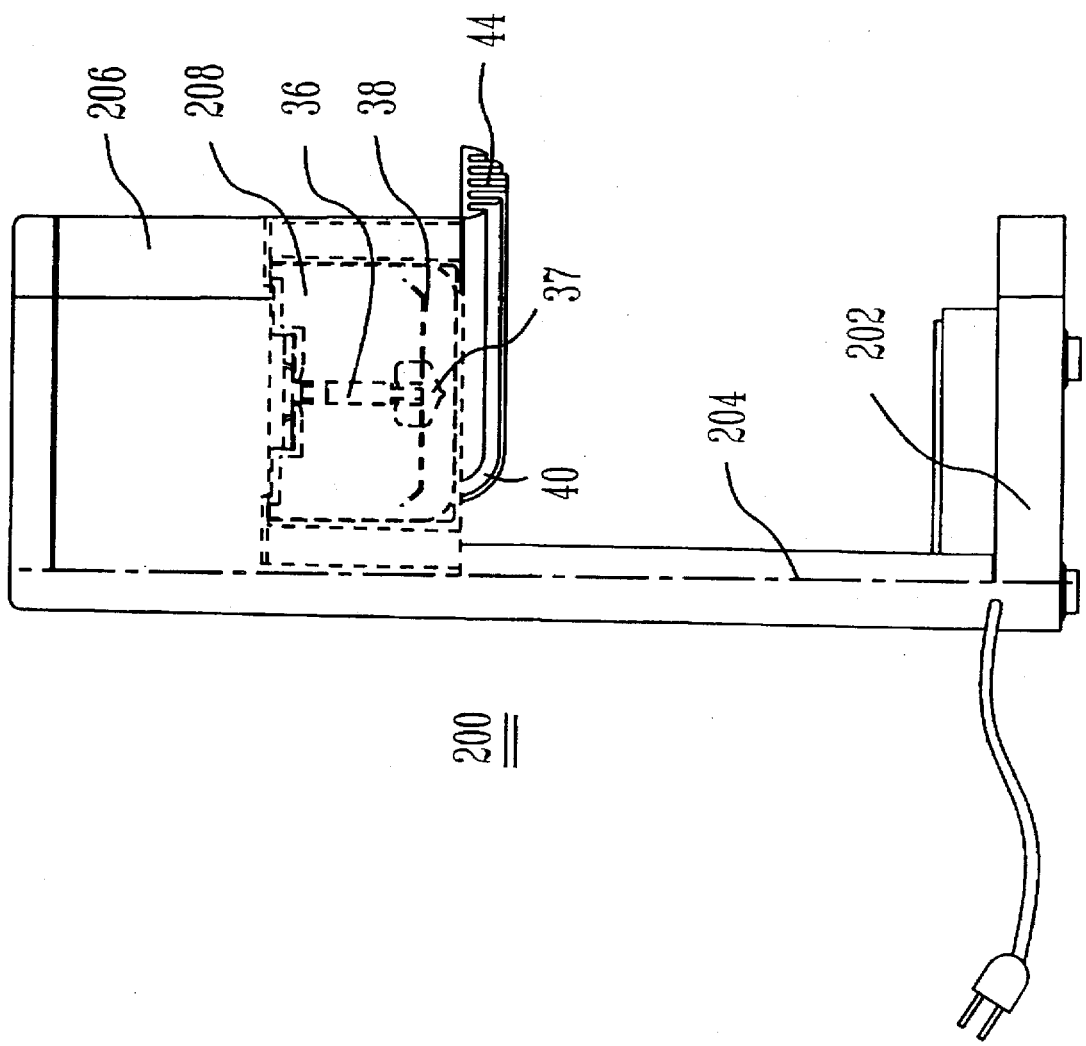
FIG. 9C is a side elevation view of the coffee grinder as shown in FIG. 1.

It should be also understood that although the grinding means 22 in FIG. 8 is shown as a part of the coffee brewing apparatus 10, the grinding means 22 can be a separate unit as shown in FIG. 9C. For example, the coffee grinder 200 of FIG. 9C incorporates a base portion 202, a vertically extending main body portion 204 which is connected to the base portion 202 and a motor housing 206 with the main body portion 204 defining a interior cavity 208. Inside the motor housing 206 is the motor 30, motor shaft 32, blade shaft 36 and grinding blade 38, with the grinding blade 38 disposed external to the interior cavity 208 below the motor 30 and over the grinding blade 38 similar to that shown and described in FIG. 8. Similar to the housing of the coffee brewing apparatus 10, the motor housing 206 is preferably made out of a plastic material such as polypropylene.

Figure 4:
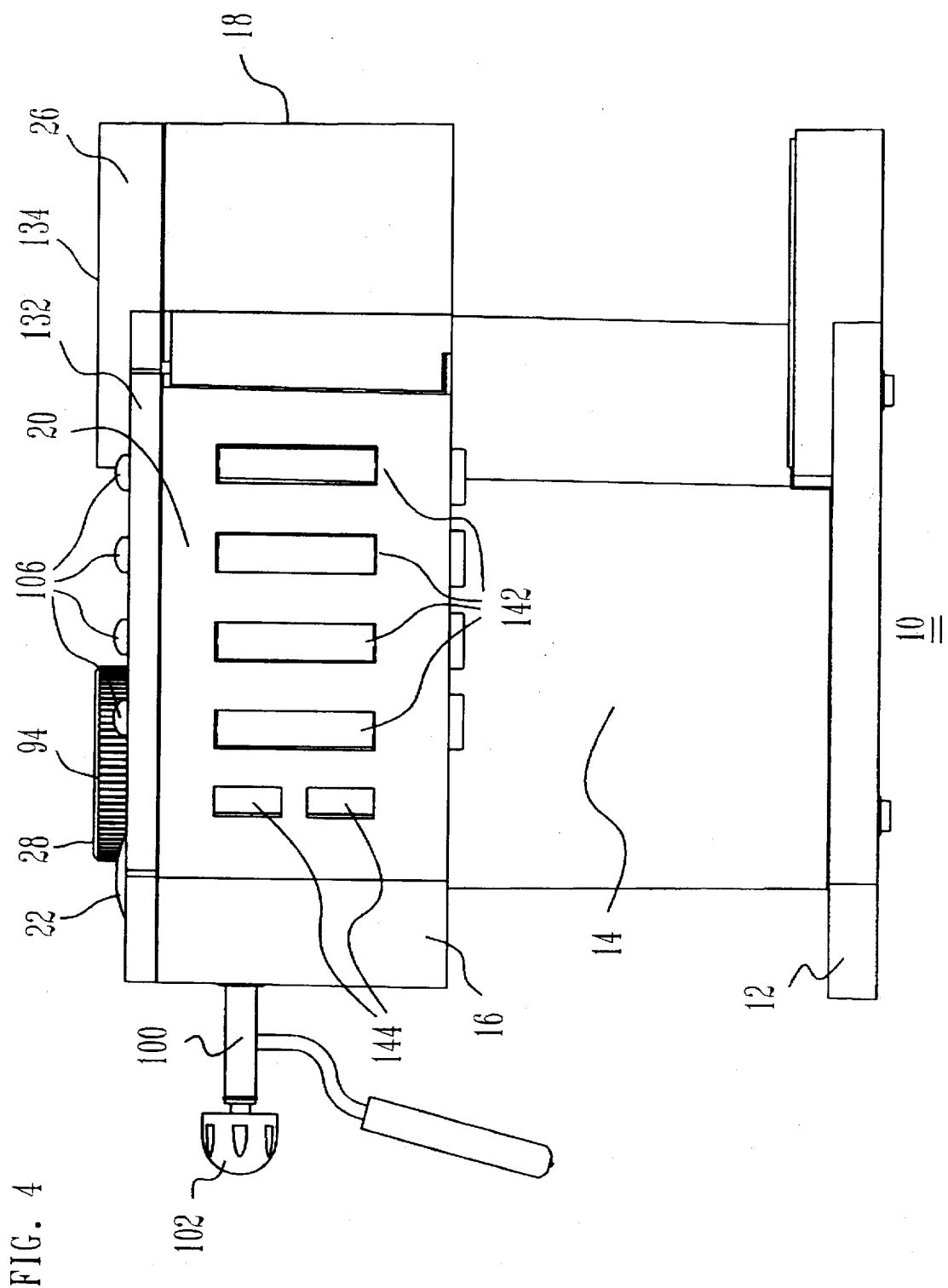
FIG. 4 is a front elevational view of the coffee brewing apparatus of FIG. 1.

Dispensing means 24 shown in FIGS. 10A and 10B, include at least one flavor bottle or container 76 and a metering mechanism 78 for dispensing flavoring onto the ground virgin coffee beans with each container being dimensioned to accommodate a corresponding flavored composition. Typically, the container 76 is provided with a threaded neck portion with the metering mechanism 78 being adapted to be mounted on the threaded neck portion 80 of the container 76 for retaining one of the motoring mechanisms 78. Each of the motoring mechanisms 78 is in fluid communication with one of the containers and are manipulable to control the dispensing of an amount of flavored composition. As well, the container or flavor bottle 76 is provided with an indication area 82 for indicating the type of flavoring in the container 76. This indication area 82 is adapted to project through viewing aperture 142 of the middle portion 20 of the coffee brewing apparatus 10 as shown in FIG. 4.

As shown in this embodiment, when the container 76 is in its upside down or inverted position, the motoring mechanism 78 is in the lower most position. By applying a force denoted by arrow F at element 84, the metering mechanism 78 is depressed thus dispensing a quantity of flavor. As is evident to one skilled in the art, any number or types of flavors may be provided. For example, flavorings such as amaretto, hazelnut, raspberry or mocha may be provided in different flavor bottles 76 that may be provided in the coffee brewing apparatus 10.

Also as shown on FIGS. 10A and 10B, each flavor bottle 76 is provided with an indication area for identifying to the consumer the type of flavoring contained in the flavor bottle 76.

Figure 10C:
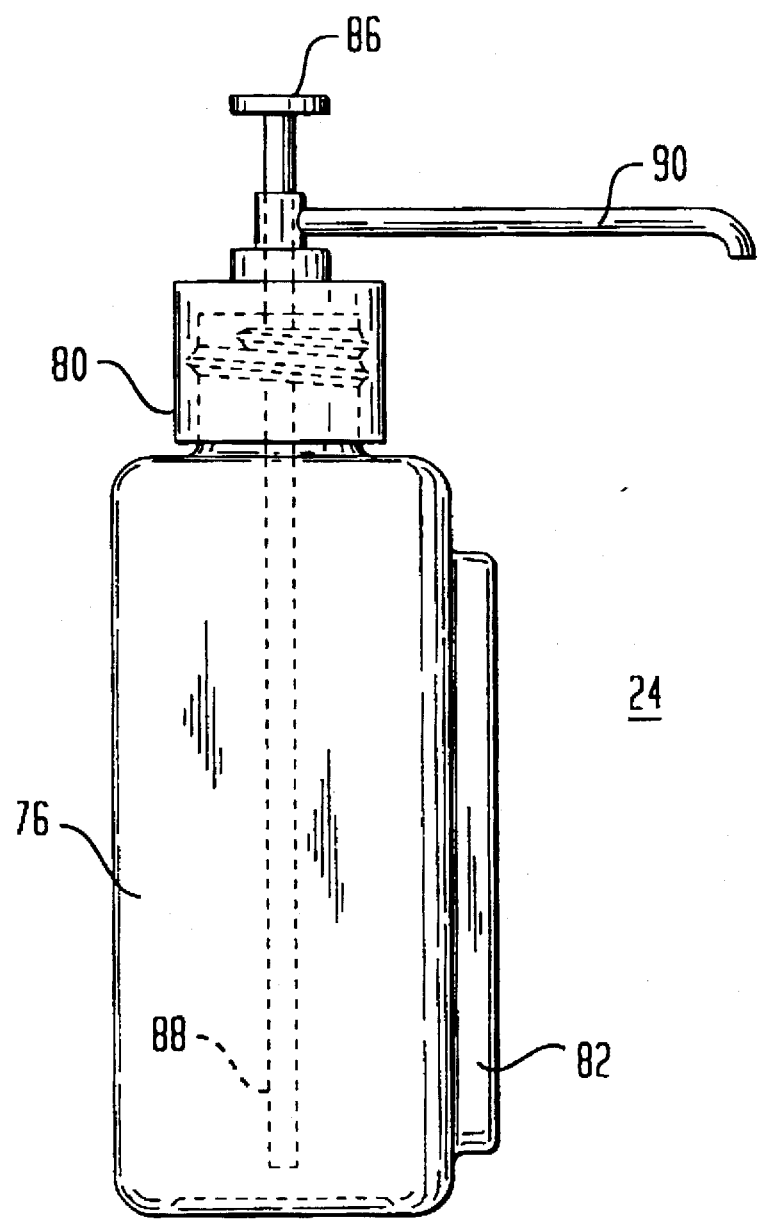
FIG. 10C is a front elevational view of an alternate embodiment of the dispensing means.

Numerous various embodiments of a dispensing means 24 for dispensing flavoring may be provided. For example, and as shown in FIG. 10C, the flavor bottle 76 may be positioned in a upright position and by pushing down on a pump mechanism 86, flavoring is dispensed through tube 88 and out dispenser end 90. In this way and similar to the inverted flavor bottle described earlier, as shown and described in FIGS. 10A and 10B, a consumer can control the amount of flavored composition being dispensed into the ground virgin coffee beans.

The dispensing means 26 is dimensioned and arranged to be positioned in the middle portion 20 of the coffee brewing apparatus 10 between the grinding means 22 and the brewing means 26. However, it is to be understood by one skilled in the art that the positioning of the dispensing means 24 is not critical to its operation.

Figure 6:
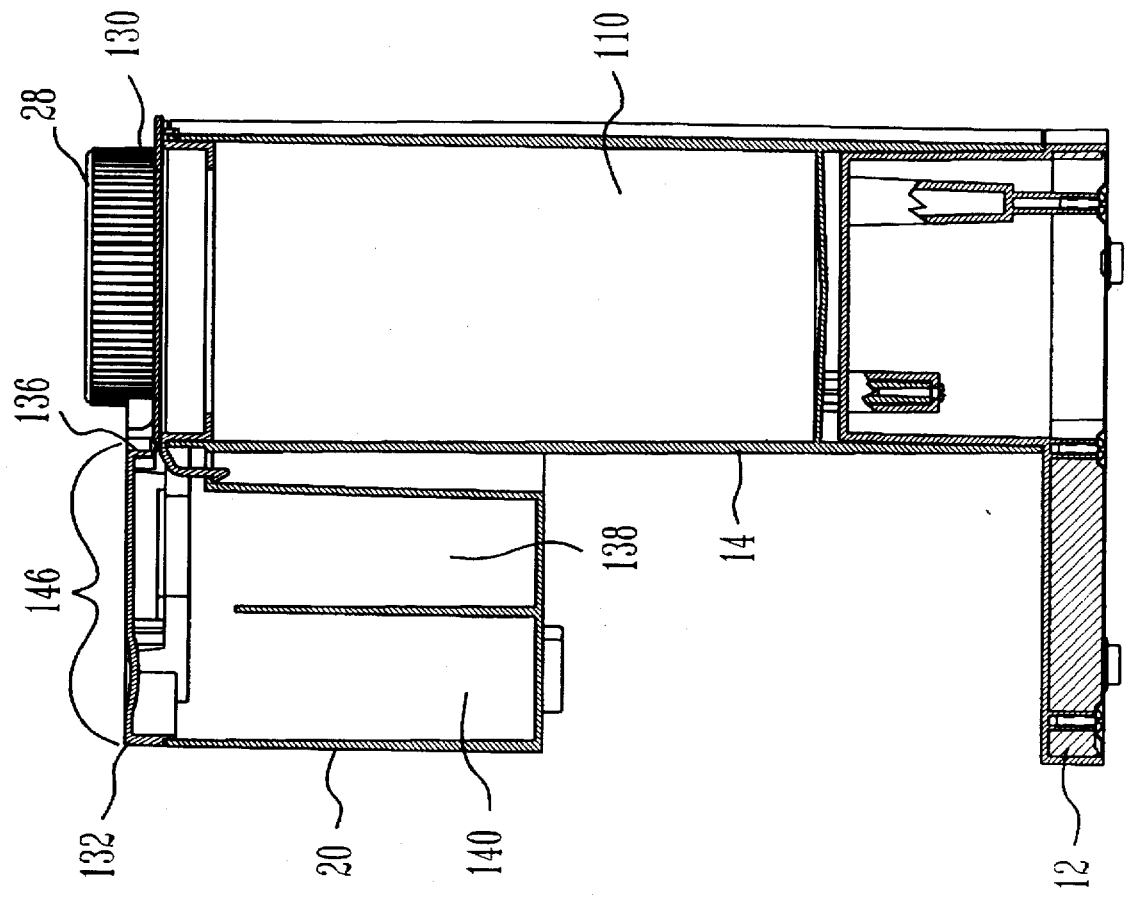
FIG. 6 is a cross sectional side view, taken across line B—B in FIG. 1, so as to show a dispenser and filter storage compartments.

Referring to FIG. 6, the coffee brewing apparatus 10 includes a housing with the housing defining at least one dispensing compartment 146 having a first interior portion 140 for receiving at least one of the containers 76 and a second interior portion 138. As discussed previously, one or more flavor bottles 76 can be dimensioned and arranged to fit within the first interior portion 140 of the dispensing compartment 146 for dispensing flavorings. Additionally, the housing can be provided with a plurality of interior chambers 60, each of the interior chambers 60 being dimensioned and arranged to receive one of the plurality of containers 76. As well, each of the interior chambers 60 is provided with a viewing aperture 142 which extends through an exterior surface of the housing and wherein each container 76 is provided with a substantially transparent viewing area alignable with one of the viewing apertures 142 to permit visual identification of the type and remaining amount of the flavored composition disposed therein.

As shown in FIG. 10A, each flavor bottle 76 rests on a shelf 79 having an aperture 81 through which part of the metering mechanism 78 may project. A flavor button 106 is arranged at a first end of the container 76 with the metering mechanism 78 being arranged at a second end of the container 76. In this way, when a force is applied in a vertical direction on the flavor button 106 as denoted by arrow F, the force on the flavor button 106 depresses the flavor bottle 76 and a portion of the metering mechanism 78 relative to the shelf allowing a metered amount of flavored composition to be dispensed from the container 76. As shown in FIG. 6, the second compartment 138 of dispensing compartment 146 can be utilized for storage of extra filters (not shown). As well, a flavor bottle cover 132 which is hingedly arranged about hinge pivot point 136 so that the bottle cover 132 opens from front to back may be provided.

Figure 5:
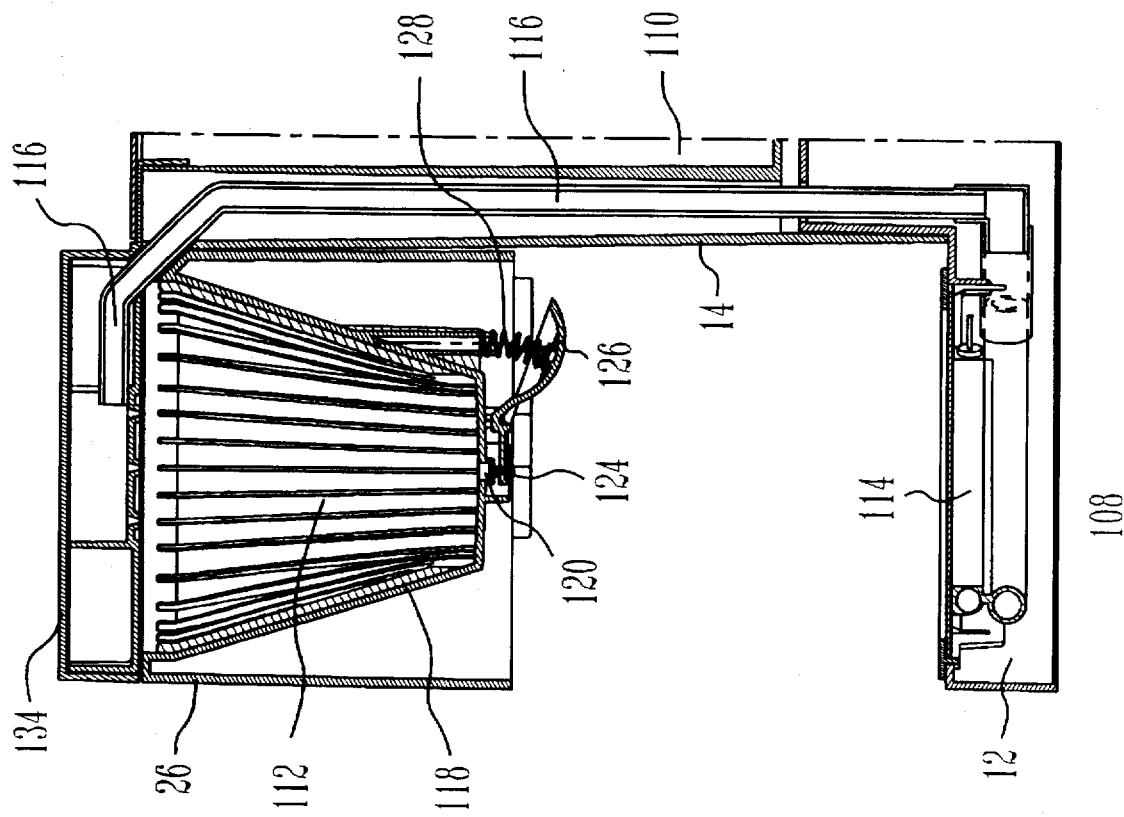
FIG. 5 is a cross sectional view along section A—A of the brewing means as shown in FIG. 1.

As shown in FIG. 5, means for brewing 26 the favored coffee beans is provided and as appreciated by one of ordinary skill in the art, any type of brewing means may be utilized with this invention. Typically, such brewers 26 include a heating or boiling compartment 108, a water holding compartment 110 and a brewing compartment 112. The water holding compartment 110 is filled with a variable quantity of water, depending upon the number of cups of coffee desired. In the heating compartment 108, electrical heating means 114 is provided which imparts heat to the water to bring the water to a desired temperature. Discharge means in the form of a conduit or tube 116 is located in the heating compartment 114 and has one end in communication with the water within the water holding compartment 110 and its other end in communication with the brewing compartment 112 which is at atmospheric pressure. When the water reaches a predetermined temperature of approximately 90° to 95° Celsius, the differential pressure, that is the pressure within the heating compartment 108 acting against the pressure within the water holding compartment 110 causes the water to be discharged through the tube 116 into the brewing compartment 112. The brewing compartment or receptacle 112 contains a filter holder 118 which holds a cup shaped permeable paper coffee filter (not shown). Typically, the brewing compartment 112 is provided with a cover 134. Depending on the number of cups of coffee to be brewed, the level of the bed of coffee grounds in the filter will correspondingly vary. Accordingly, the heated water is introduced into the brewing compartment 112 and allowed to contact the ground coffee (not shown). An outflow aperture is dimensioned and arranged to permit discharge of brewed coffee therefrom and into a carafe 122 (as shown in FIG. 1) positioned beneath the brewing compartment 112. The outflow aperture 120 includes a filter valve stopper 124 which is mounted on a filter valve lever 126. The filter valve lever 126 is biased by a filter valve spring 128 in a position wherein the filter valve stopper 124 acts to seal aperture 120. As shown in FIG. 1, when the carafe 122 is positioned beneath the filter stopper valve 26, the filter valve lever 126 is caused to pivot thus opening the filter valve stopper 124 allowing the brewed coffee to drip into the carafe 122.

Figure 3:
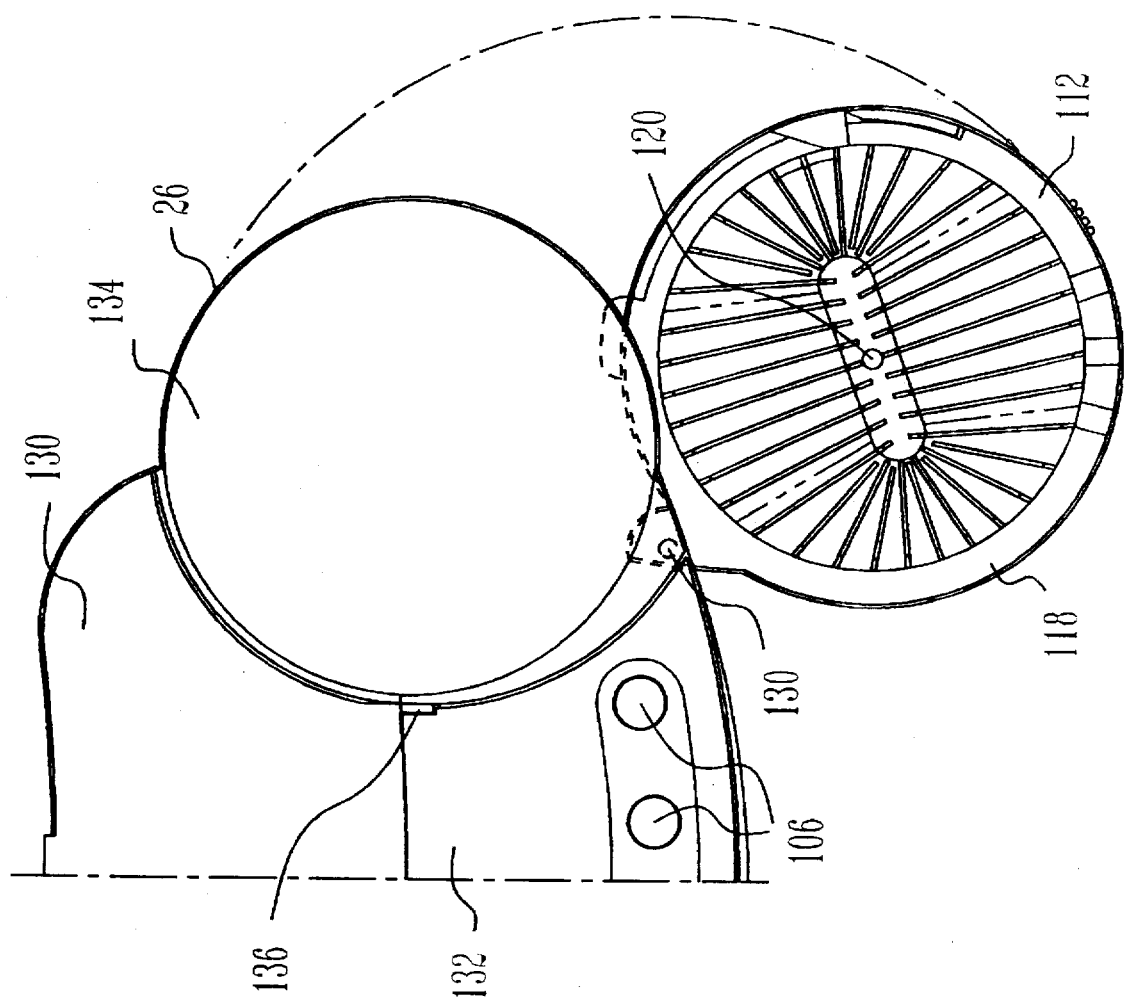
FIG. 3 is a top view of the coffee brewing apparatus showing a filter holder and filter basket in an open position.

FIG. 3 shows the filter basket or receptacle 112 mounted for rotation about a vertical axis 130 so that the filter basket 112 and filter holder 118 can be pivoted about the vertical axis 130 and so that the receptacle 112 can retain ground virgin coffee beans to be brewed. In this way, the filter basket 112 may be swung open thus allowing easy access to the filter basket 112.

Figure 7:
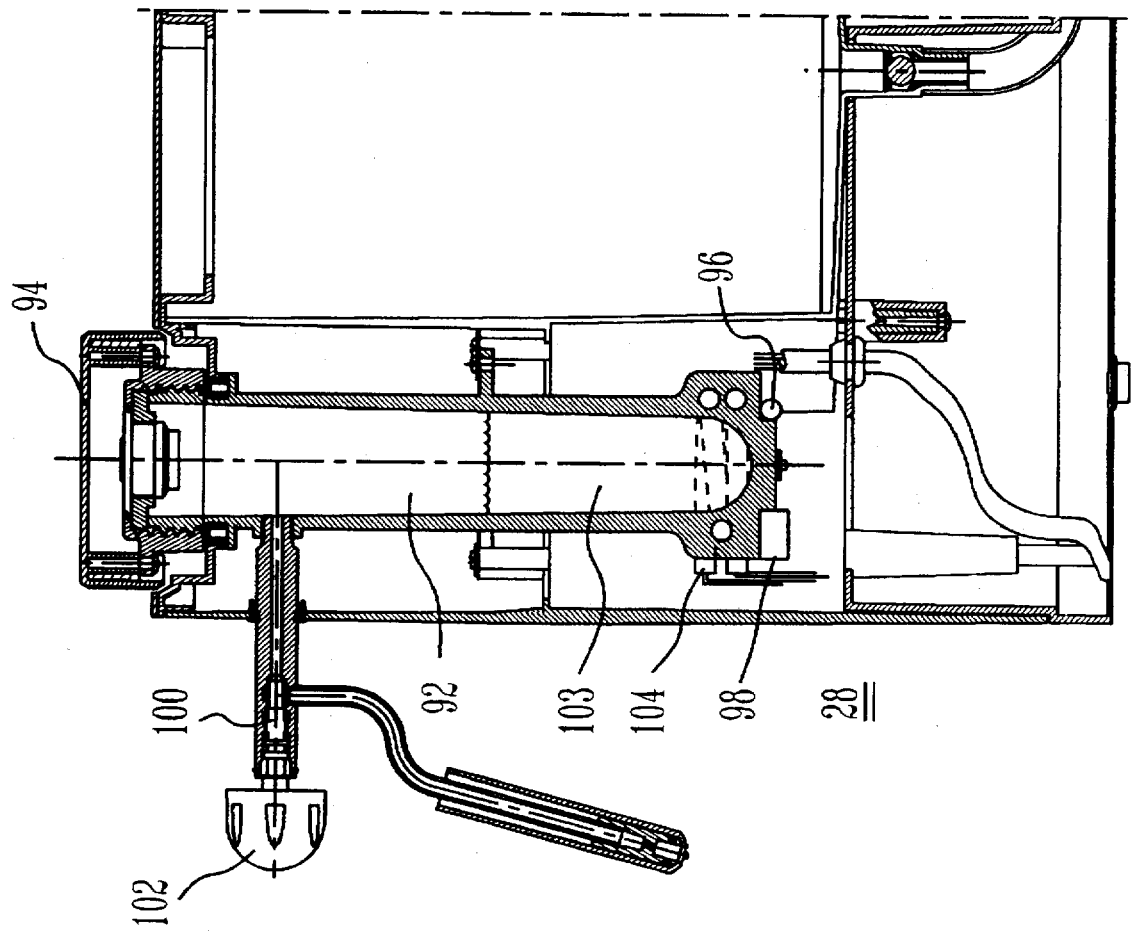
FIG. 7 is a cross sectional view, taken across line C—C in FIG. 1, so as to show a frother means.

As shown in FIG. 7, the coffee brewing apparatus 10 may be provided with a frothing means 28. Specifically, the frothing means 28 is used for frothing liquids such as milk. As presently preferred, the frothing means 28 is unitary with the coffee brewing apparatus 10 and is constructed and arranged as normally utilized in the prior art and is not a new or novel portion of this invention. Such a frother means 28 includes a pressurized steam vessel 92 which is connected to an outer cap 94 which is threadably attached to the pressurized steam vessel 92 as well as a steam ejector for producing aerated steam. Typically, such frother means 28 commonly use a thermal fuse 96 and a temperature sensor 98 for controlling the temperature and pressure in the pressurized stem assembly 92. A valve assembly 100 is utilized in order to release the aerated steam 102 in the pressurized steam vessel 92. The aerated steam 102 is released from the valve assembly by a valve assembly outer cap 102 and is utilized to froth milk in a container (not shown). The pressurized steam vessel 92 is heated by a heating element 104 with power being supplied by the main power supply of the coffee brewing apparatus (not shown).

Figure 2:
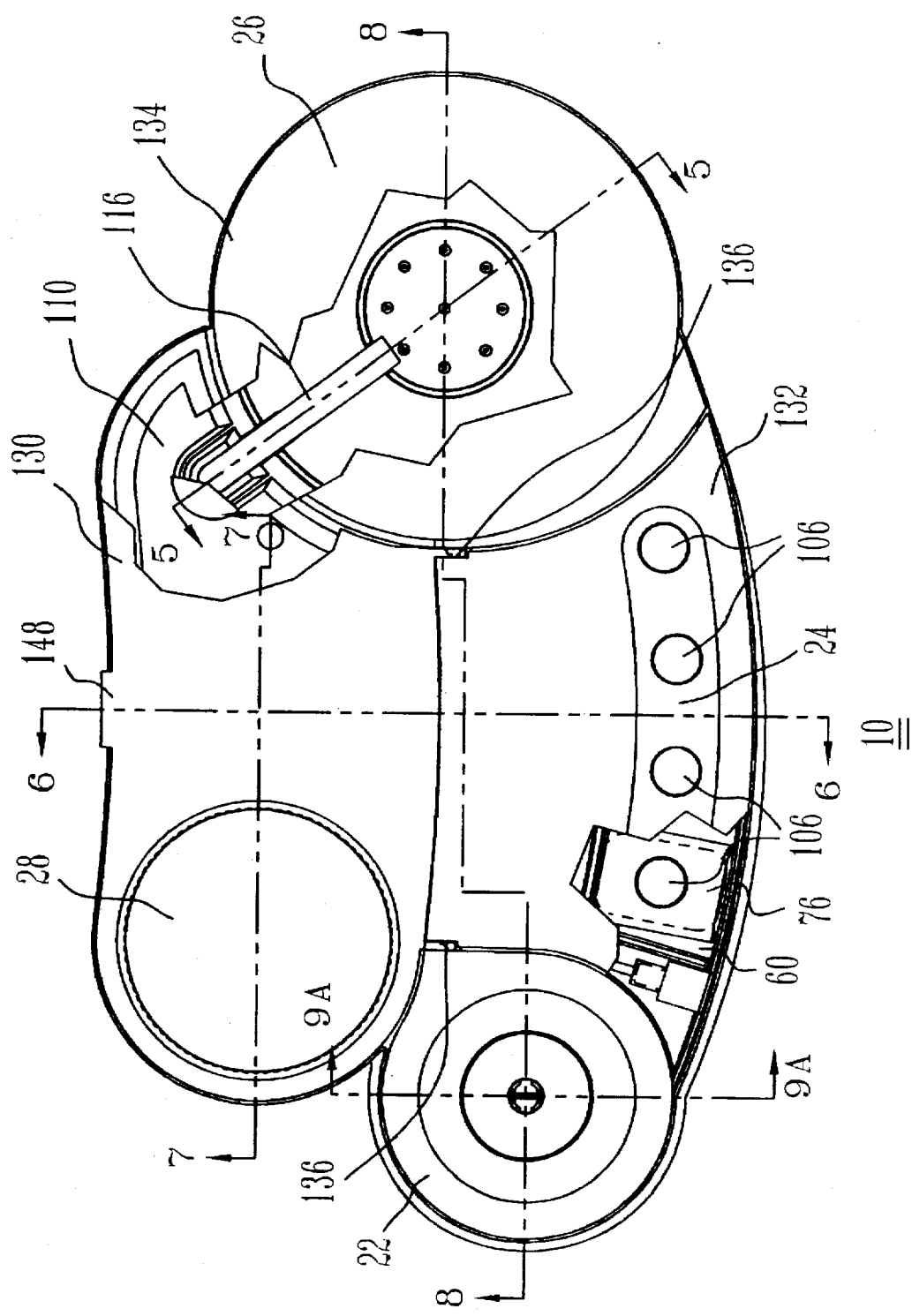
FIG. 2 is a top plan view of the coffee brewing apparatus as shown in FIG. 1 and partly broken away so as to show the brewing compartment and flavor bottle.

FIG. 2 provides an overall top view of the structure of the coffee brewing apparatus 10 with the grinding means 22, the brewing means 26, the dispensing means 24 and the frothing means 28 shown in their respective positions. The water holding compartment 110 is provided with a water compartment cover 130 which is hingedly attached about hinge pivot point 148. Typically, the housing of the coffee brewing apparatus 10 may be fabricated out of a polypropylene material.

As well a method of brewing a flavored coffee beverage is provided. First virgin, whole coffee beans are ground in a grinding apparatus 22. Next, utilizing a dispensing means 24, at least one flavored composition is dispensed onto the ground virgin beans obtained during the grinding step. A heated liquid is introduced into the flavored ground virgin beans obtained during said dispensing step to produce the flavored coffee beverage. Additionally, the grounds obtained during the grinding step may be transferred into the brewing receptacle 112 prior to dispensing flavored composition thereon.

It is to be understood that the drawings are not necessarily drawn to scale but that they are merely conceptual in nature.

It should also be understood that the preferred embodiments and examples described are for illustrative purposes only and are not to be construed as limiting the scope of the present invention which is properly delineated only in the appended claims.

What is claimed is:

1. A coffee brewing apparatus for producing a selectively flavored, coffee beverage, comprising:

a housing;

a receptacle, securable to said housing, for retaining ground virgin coffee beans to be brewed;

dispensing means, at least partially disposed within said housing, for dispensing a flavored composition into said coffee beverage, said dispensing means comprising at least one container, said container being dimensioned to accommodate a corresponding flavored composition: and brewing means, at least partially disposed within said housing, for introducing a heated liquid into said receptacle.

2. The coffee brewing apparatus of claim 1, further comprising grinding means coupled to said housing, for grinding coffee beans.

3. The coffee brewing apparatus of claim 2, wherein said grinding means includes a blade shaft, a grinding blade coupled to said blade shaft for rotary movement therewith, driving means for rotating said blade shaft, and a grinder cup positionable over said grinding blade, said grinding blade being operable to grind beans disposed in said grinder cup.

4. The coffee brewing apparatus of claim 3, wherein said driving means includes an electric motor and wherein said grinding means further includes activation means for selectively energizing said electric motor.

5. The coffee brewing apparatus of claim 4, wherein said activation means includes a limit switch having a resiliently biased lever movable between a first, non-energizing position and a second, energizing position and wherein said grinder cup includes an inner surface, an outer surface, and a camming tooth located on said outer surface such that when said grinder cup is located relative to said housing, said camming tooth is adapted to move said lever into the second position and thereby initiate grinding of coffee beans contained in the grinder cup.

6. The coffee brewing apparatus of claim 4, wherein said electric motor includes a threaded motor shaft having a distal end threadedly engageable with said blade shaft to retain the blade shaft during driven rotation thereof.

7. The coffee brewing apparatus of claim 6, further including means for selectively restricting rotation of a proximal end of said motor shaft such that said blade shaft may be threadedly disengaged from said distal end.

8. The coffee brewing apparatus of claim 3, wherein said grinder cup includes a metal liner for defining an interior surface thereof.

9. The coffee brewing apparatus of claim 1, wherein said dispensing comprises a plurality of said containers and wherein said housing defines at least one interior chamber for receiving said plurality of containers.

10. The coffee brewing apparatus of claim 9, wherein said housing defines a plurality of interior chambers, each said interior chamber being dimensioned and arranged to receive one of said plurality of containers.

11. The coffee brewing apparatus of claim 10, wherein said chamber defines a viewing aperture extending through an exterior surface of said housing and wherein each said container defines a substantially transparent viewing area alignable with one of said apertures to permit visual identification of a flavored composition disposed therein.

12. The coffee brewing apparatus of claim 9, wherein said dispensing means further includes a plurality of metering mechanisms, each said metering mechanism being in fluid communication with one of said containers and being manipulable to control an amount of flavored composition dispensed therefrom.

13. The coffee brewing apparatus of claim 12, wherein each said container defines a threaded neck portion for retaining one of said metering mechanisms.

14. The coffee brewing apparatus of claim 9, wherein at least one of said containers contains a flavoring composition selected from the group consisting of amaretto, raspberry, hazelnut and mocha.

15. The coffee brewing apparatus of claim 1, wherein said dispensing means further includes a metering mechanism in fluid communication with each container for controlling an amount of flavored composition dispensed therefrom.

16. The coffee brewing apparatus of claim 2, wherein said housing includes a base portion and a main body portion vertically extending from said base portion, said main body portion having a first end, a second end, and an intermediate section extending between said first and second ends, and wherein said grinding means is disposed proximate said first end, said dispensing means is disposed proximate said intermediate section, and said brewing means is disposed proximate said second end.

17. The coffee brewing apparatus of claim 16, wherein said dispensing means comprises a container for retaining a flavored composition and wherein said intermediate section defines a chamber for retaining said container, said chamber defining an aperture to permit viewing of said container and said intermediate section further including a removable lid for permitting insertion and removal of said container.

18. The coffee brewing apparatus of claim 17, wherein said dispensing means further includes a flavor button arranged at a first end of said container and a metering mechanism arranged at a second end of said container, so that when a force is applied in a vertical direction on said button, said metering mechanism permits a flavored composition to be dispensed from said container.

19. The coffee brewing apparatus of claim 1, wherein said brewing means includes a water holding compartment for holding a supply of Water, heating means in fluid communication with said water holding compartment for heating said supply of water, and a conduit for supplying water heated by said heating means to said receptacle.

20. A coffee brewing apparatus for producing a selectively flavored coffee beverage, comprising:

a housing;

a receptacle, securable to said housing, for retaining ground coffee beans to be brewed;

dispensing means, at least partially disposed within said housing, for dispensing a flavored composition onto said ground coffee contained within said receptacle, said dispensing means comprising at least one container, said container being dimensioned to accommodate a corresponding flavored composition; and brewing means, at least partially disposed within said housing, for introducing a heated liquid into said receptacle to thereby produce the selectively flavored coffee beverage.

21. The coffee brewing apparatus of claim 20, wherein said dispensing means comprises a plurality of containers and wherein said housing defines at least one interior chamber for receiving said plurality of containers.

22. The coffee brewing apparatus of claim 21, wherein said housing defines a plurality of interior chambers, each said interior chamber being dimensioned and arranged to receive one of said plurality of containers.

23. The coffee brewing apparatus of claim 22, wherein said chamber defines a viewing aperture extending through an exterior surface of said housing and wherein each said container defines a substantially transparent viewing area alignable with one of said apertures to permit visual identification of a flavored composition disposed therein.

24. The coffee brewing apparatus of claim 21, wherein said dispensing means further includes a plurality of metering mechanisms, each said metering mechanism being in fluid communication with one of said containers and being manipulable to control an amount of flavored composition dispensed therefrom.

25. The coffee brewing apparatus of claim 24, wherein each said container defines a threaded neck portion for retaining one of said metering mechanisms.

26. The coffee brewing apparatus of claim 21, wherein at least one of said containers contains a flavoring composition selected from the group consisting of amaretto, raspberry, hazelnut and mocha.

27. The coffee brewing apparatus of claim 20, wherein said brewing means includes a water holding compartment for holding a supply of water, heating means in fluid communication with said water holding compartment for heating said supply of water, and a conduit for supplying water heated by said heating means to said receptacle.

* * * * *